April 11, 1961 H. E. METCALF 2,978,916
MOTION CONVERTER
Filed Nov. 19, 1956 3 Sheets-Sheet 1

INVENTOR:
Herbert E. Metcalf

April 11, 1961   H. E. METCALF   2,978,916
MOTION CONVERTER
Filed Nov. 19, 1956   3 Sheets-Sheet 2
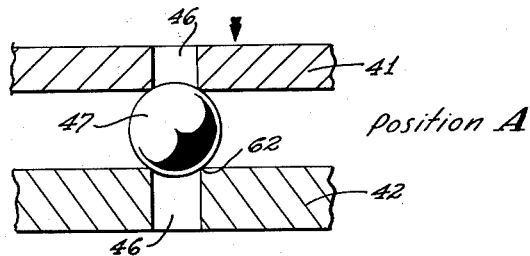
Fig. 5 — Position A
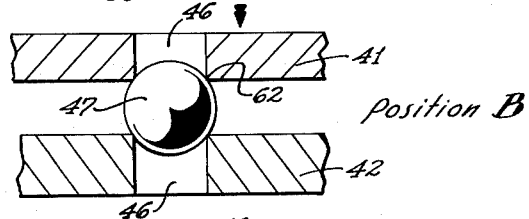
Fig. 6 — Position B
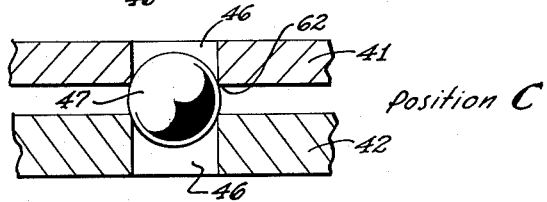
Fig. 7 — Position C
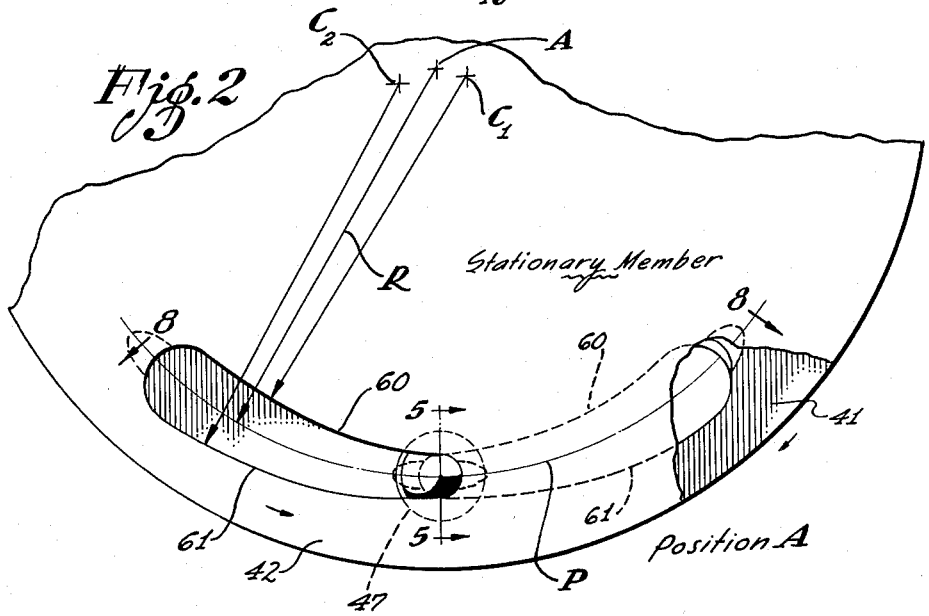
Fig. 2
INVENTOR:
Herbert E. Metcalf

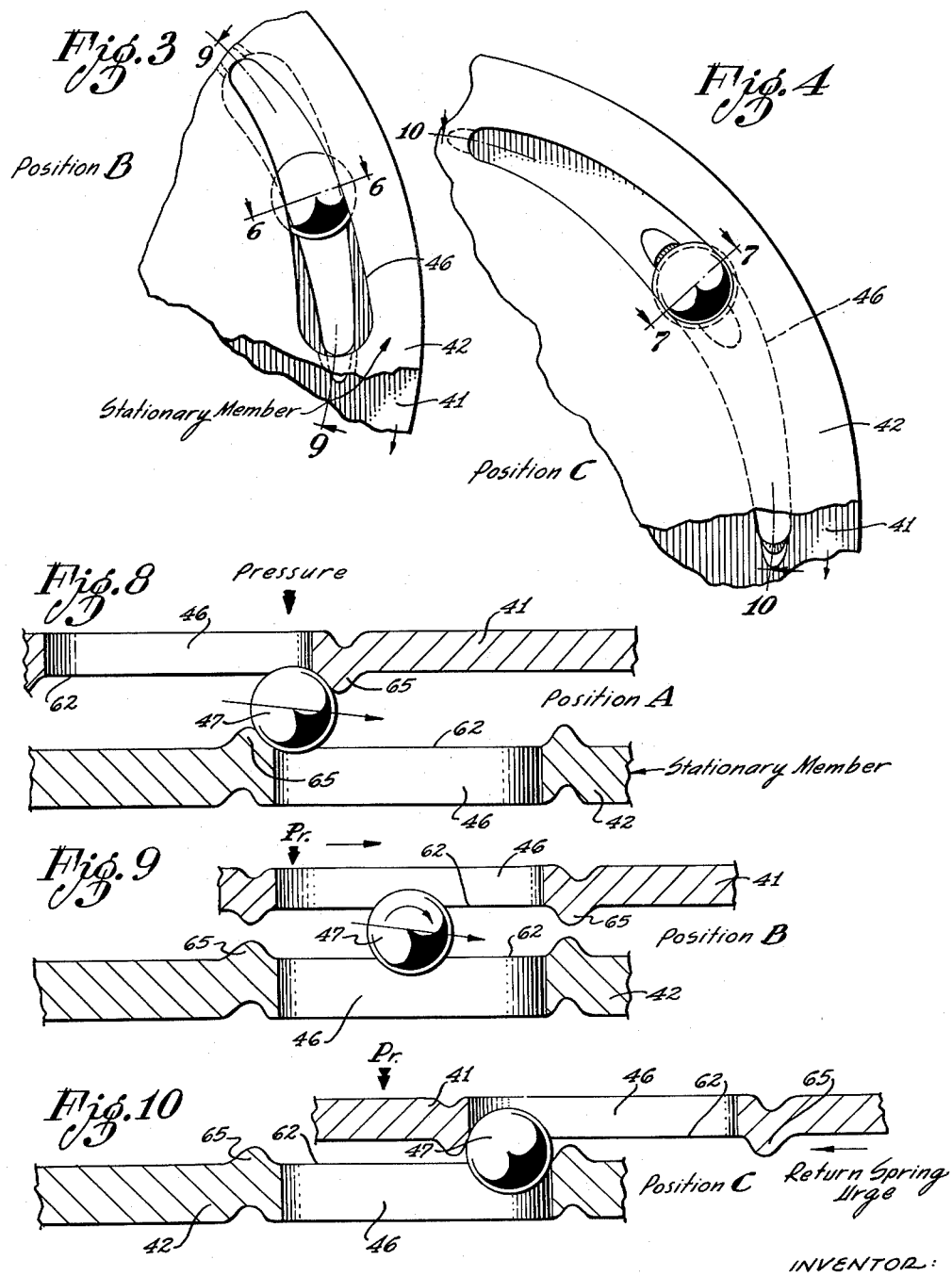

2,978,916

MOTION CONVERTER

Herbert E. Metcalf, P.O. Box 35, Malibu, Calif.; Carol R. Metcalf, administratrix of said Herbert E. Metcalf, deceased Filed Nov. 19, 1956, Ser. No. 623,082

11 Claims. (Cl. 74—99)

My invention relates to motion transducers and more particularly to a device whereby axial motion can be directed to produce a rotary motion and vice versa.

Among other objects of my invention are:

To provide an efficient motion transducer for turning axial into rotary motion and vice versa, with a minimum of friction;

To provide a motion converter substantially free from dust contamination problems;

To provide a motion converter having an exceptionally long life and freedom from wear;

To provide a motion converter unit capable of electric, hydraulic, pneumatic and cam operation, for example;

To provide a ball type motion converter having inherent ball retention characteristics;

To provide a motion converter capable of precision manufacture and operation;

To provide a motion converter requiring no oil for long life, low wear operation and, in consequence, capable of efficient operation at extreme high or low temperatures;

To provide a motion converter in which all bearing surfaces can be hardened;

To provide a solenoid actuated motion converter relatively free from concentricity problems;

To provide a solenoid actuated motion converter in which the magnetic structure and the motion converter device are readily assembled;

To provide a solenoid actuated motion converter having a free floating magnetic core;

To provide a highly efficient solenoid actuated rotary actuator providing a high torque per unit current consumption;

To provide a ball bearing having a low coefficient of friction;

And to provide a ball bearing in which the ball races have only edge contact with a ball.

Briefly described, the motion converter of my invention comprises a pair of members mounted to be relatively rotatable. A pair of opposed slots are provided in which a ball is located connecting the two members. The slot edges are divergently directed to cause an axial movement of a member to be translated into a rotary motion as the ball rolls solely on two of the slot edges in each member, for example. The extent of rotary movement and the relation thereof to the axial movement can be controlled by the contour of the slot edges. As a transducer of axial to rotary motion the actuator providing the axial motion may be, for example a solenoid core, a hydraulic or pneumatic piston, a cam, or like device.

The ball bearing between the two members has exceptionally low friction in that the ball rolls on the edges only of the slots. The device is therefore ideally suitable for use in a solenoid operated rotary actuator, thereby providing a high ratio of torque to current consumption.

Solenoid actuators for rotating a shaft are well known per se, typical prior art devices being shown in German Patent No. 659,975, dated May 18, 1935 for example, or in the Caldwell U.S. Patent No. 1,644,171, dated October 4, 1927. However, such devices are not suited for rapid cycling, such as at 15 to 30 cycles per minute, for example as needed for modern stepper motor use, nor do they provide sufficiently high torque per unit current consumption. It is therefore still another object of my invention to provide a motion converter ideally suitable for solenoid operation which results in an efficient electrical actuator suitable for high speed reversible stepper motor operation, such as that motor for example shown in the U.S. patent to White, No. 2,706,259, issued April 12, 1955.

However, the relatively high friction characteristics of the roller and slant surface devices as shown in the German patent cited above were early recognized, and a rolling ball interposed between two slant surfaces was then utilized to reduce friction.

Such motion converters of the ball and slant surface race type are well known in the art and have been used to convert axial movement into rotary movement as for example in the cam operated device shown in the U.S. patent to Perkins, No. 1,790,999, issued February 3, 1931.

In addition, the reverse conversion of rotary to axial movement by means of balls mounted between slanting surfaces in opposed members is exceptionally well shown in the U.S. patent to Urban, No. 1,585,140, issued November 27, 1922, who discloses many ball and slant surface arrangements in his Figures 7 to 12 inclusive. It is to be noted that many of these ball and surface assemblies require ball retainers to be operable, and that dust or grit falling on any of the slant surfaces of the devices of Perkins and Urban can readily come between ball and surface and thereby cause wear on both surface and ball. It is further to be noted that the use of a ball retainer absorbs power and that in solenoid operated devices of small power output such retainers may create unacceptable power requirements per inch-pound of torque.

Devices constructed in accordance with the general teachings of Perkins and Urban will be referred to hereinafter as "ball and slant surface race" devices. In contrast, the present device, using no slant surface races and with the ball bearing only on slot edges, will be referred to as "ball and slot" devices.

The word "edge" as used herein shall mean the junction of two surfaces placed at less than a 180° angle to each other as formed, following normal machining or die blanking principles. The edges may be de-burred, slightly bevelled or chamfered without departing from the spirit of the invention, but I prefer to use the edges just as they come from the machining operation if no burr exists.

The word "slot" as used herein shall mean a depression or cut away portion in a surface of a member, this depression having relatively sharp edges as defined above on which a ball can travel, the depth of said depression being such that the ball can roll on the edges only of the depression without contacting the bottom or sides thereof. A convenient way, however, to manufacture such slots is to use plate or sheet material and to cut the slots entirely through the material as with the use of dies in a punch press.

The desired result however is only to provide the proper edges for the ball to roll on, irrespective of the manner in which the remainder of the slot is formed, as only the edges are used in the present invention.

It is also to be noted that both in the device of Perkins in which the main power is applied axially to create a desired rotary motion, and in the device of Urban in which the main power is applied rotationwise to create axial movement, the return stroke operates in the reverse sense under secondary power, i.e., that produced by a spring. In like manner the device of the present invention is reversible in operation.

Certain prior types of solenoid actuators depend on balls or rollers operating in races wherein contact is made by the rotation element with a slant surface. One of the race members is part of the magnetic flux circuit and therefore must be made of soft iron. Dust or grit caught between ball and race can wear the soft race or both, and may result in substandard operation and relatively short life. Enclosing the races to be dust free greatly increases cost. The present invention, wherein all ball contact is with slot edges only, does not suffer from dust wear, need not be enclosed, and all wear edges can be hardened thereby providing precision operation over millions of operation cycles.

Other objects and many advantages of my invention will be still further apparent from the ensuing description of the devices shown in the drawings, in which:

Figure 2 is a plan diagram of the slot edge contours of a ball and slot configuration embodying the present invention, with the ball at the small ends of the slots at the start of a cycle.

Figure 3 is a plan view diagram of the slot edge contours with the ball in the middle of the slots during relative disc rotation.

Figure 4 is a plan view diagram of the slot edge contours with the ball at the large ends of the slots at the end of a cycle.

Figures 5, 6 and 7 are cross sectional view diagrams taken as shown by lines 5—5, 6—6 and 7—7 of Figures 2, 3 and 4 respectively.

Figures 8, 9 and 10 are median line slot sectional view diagrams taken as indicated by lines 8—8, 9—9 and 10—10 in Figures 2, 3 and 4 respectively.

Figure 11:
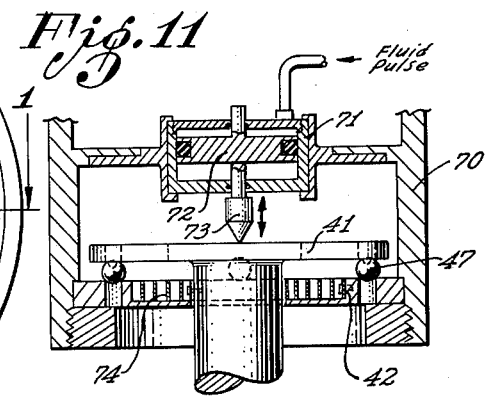

Figure 11 is a diagrammatic longitudinal sectional view of a fluid pulse controlled rotary actuator.

Figure 12:
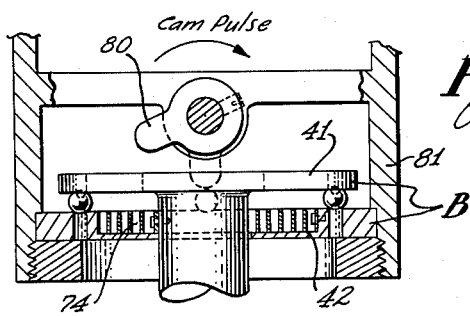

Figure 12 is a diagrammatic longitudinal sectional view of a cam controlled rotary actuator.

In some of these drawings, particularly in the diagrams, for clarity of illustration, four ball-slot combinations are shown. In practice three equally spaced ball-slot assemblies have been found satisfactory and are preferred.

Figure 1:
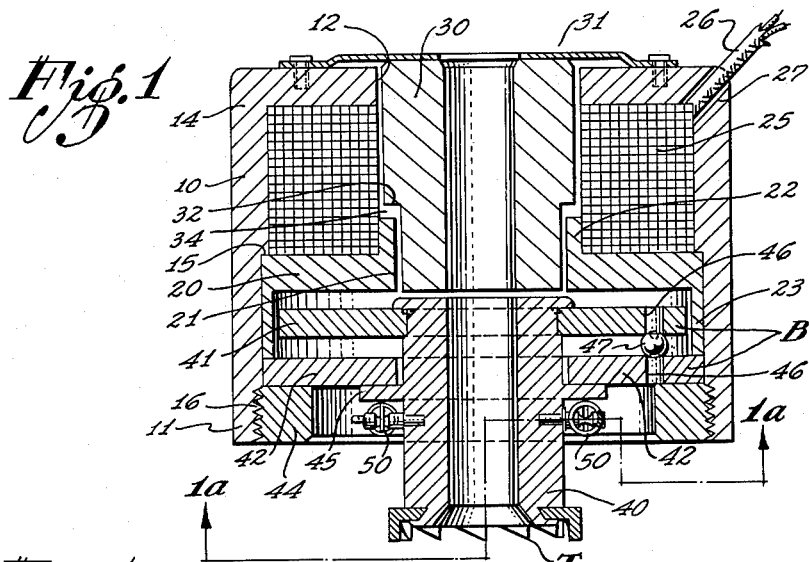
Figure 1 is a longitudinal sectional view of a solenoid controlled rotary actuator embodying a preferred form of the present invention.
Figure 1A:
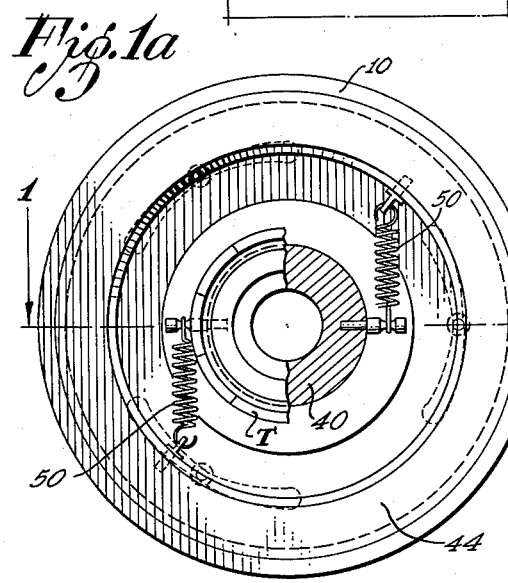
Figure 1a is an end view in elevation and partly in section taken as indicated by the line 1a—1a in Figure 1.

Referring first to Figures 1 and 1a, a longitudinal sectional view through a solenoid controlled rotary actuator is seen, embodying the present invention, using three ball-slot assemblies.

Here, a metal cup-shaped casing 10 is open at one end 11 and has a central armature aperture 12 at the other end 14. Metal is cut away from the inside wall of the cup 10 at the open end to form a shoulder 15 about midway of the cup, and the open end 11 of the cup is provided with internal threads 16. Cup 10 is made from soft magnetic core type metal.

A partition 20 of similar material is fitted to bear against shoulder 15 at one end, and is provided with a central partition aperture 21 coaxial with cup aperture 12. Partition 20 also has a small cylindrical portion 22 extending toward cup aperture 12 and a large cylindrical portion 23 fitting the cutaway inner wall of cup 10.

Between the central aperture end 14 of the cup and partition 20 is positioned a solenoid winding 25, the leads 26 therefrom passing through the cup wall through lead aperture 27.

In the axial armature space provided by such construction, an armature 30 is positioned, being kept from falling out by end cap 31.

Armature 30 is hollow and has an external large end shoulder 32 providing an air gap 34 between shoulder 32 and the end of small cylindrical portion 22 of the partition 20. Armature 30 is free to reciprocate in the armature space.

A ball and slot actuator assembly B is inserted in cup 10 through the open end 11.

This assembly B comprises a central hollow actuator shaft 40 to which is staked at one end a rotating disc 41, the other end carrying annular teeth T for engagement with whatever device it is desired to rotate, such as similar teeth on a motor shaft running through the hollow centers of armature 30 and shaft 40.

Before rotating disc 41 is staked to shaft 40, a fixed disc 42 is placed on the shaft 40, the hole in said fixed disc 42 being large enough to clear shaft 40. Fixed disc 42 is held in place against the end of large cylindrical portion 23 of partition 20 by an end disc 44 having external threads engaging internal threads 16 of the cup 10.

A shoulder 45 on shaft 40 prevents travel of shaft 40 and the attached rotating disc 41 too far toward armature 30 by bearing against fixed disc 42.

Rotating disc 41 and fixed disc 42 are provided with complementary slots 46 having balls 47 therebetween, these slots having diverging edge contours causing rotation of rotating disc 41 when armature 30 is forced, by energization of solenoid winding 25, against the end of shaft 40 as will be later described in detail. Return springs 50 are attached between shaft 40 and end disc 44 to hold shaft 40 and rotating disc 41 in the cycle position closest to armature 30 as best shown in Figure 1a.

It will be noted that the construction just above described makes for easy and rapid assembly, everything being clamped in place by the tightening of end disc 44.

The ball and slot operation of the present invention resulting in rotary motion of disc 41 can be more fully understood by reference to the diagrams in Figures 2 to 10 inclusive.

Referring first to Figure 2 the slots 46 are cut in disc members 41 and 42 so that the ball 47 can travel a median circular path P until limited by the ends of the slots. Path P is preferably circular with a radius R on the axis A of rotation of the member 41. The inner slot curvature 60 is based on a center $C_1$ on one side of axis A and the outer curvature 61 is based on a center $C_2$ on the other side of axis A, to provide a slot symmetrical on each side of ball path line P. Slots 46 in the two members are reversed with respect to each other.

In Figures 2 to 10 inclusive, three positions of the ball 47 in relation to opposed slots 46 are shown. Position A is with the ball 47 between the small ends of the slots 46, position B is with the ball 47 half way between the small and large ends of the slots 46, and position C is with the ball 47 between the large ends of the slots 46. Note that in all of the positions of the ball between the small slot ends and the large slot ends, the ball bears only on slot edges 62 as best shown in Figures 5 to 7. Note also that the location of the two bearing circles on the ball varies as the ball progresses, thereby preventing grooving of the ball. It is preferred that both the ball and at least the edges 62 of the slots 46 on which the balls 47 travel shall be hardened for maximum life.

Minute inspection of balls and slot edges after million cycle operation under dusty conditions of an actuator such as shown in Figure 1 has shown no apparent ball or slot edge wear, whereas under the same conditions many open ball and slant surface race devices show appreciable wear to the extent affecting proper operation of the actuators. In this present case the ball was a bearing ball as normally hardened, and the members 41 and 42 were made of tool steel hardened by the usual shop methods after slots 46 were cut.

Relative rotation under an axial load tending to force the members toward each other takes place as best shown in Figures 8, 9 and 10. Here the ball is placed between the small ends of the slots 46 at the start of the cycle (position A). As the ball 47 has minimum penetration into the slots in this position, it is preferred that a bumper 65 be placed on each member 41 and 42 at the small ends of the slots 46 to make sure the balls do not leave the slots on the return stroke.

In this position A of the ball, when axial pressure is applied as for example on top member 41 the ball 47 starts to roll on the four edges 62 and to sink into the slots. This action rotates the top member 41 with respect to stationary bottom member 42 as shown in Figures 9 and 10. Upon reaching position C the ball is at its deepest penetration into the slots and the top member 41 has reached its maximum rotation. The return spring 50 or other force returns the top member rotationwise and axially to the starting position A again for a repetition of the cycle when pressure is again applied axially to force the two members together.

Thus the ball is sized to be slightly larger in diameter than the maximum width of the slot at position C, and small enough to seat well in the opposed small ends of the slots in position A.

In Figures 1 to 10 inclusive I have shown the slot edges as having circular edges as previously described in the description of Figure 2. However, it may be desirable, particularly in solenoid actuated converters, to change the curvature somewhat to provide the first portion of the cycle with only a small rotation with a relatively large axial movement. Such a curvature utilizes the magnetic push of the solenoid to best advantage for certain purposes and can be accomplished by widening the slot rapidly just beyond the small ends of the slots. Other modifications of the curvature of the slot edges for special axial-rotational relationships will readily be apparent to those skilled in the art.

No difficulty is experienced in providing 45° rotation when three ball-slot assemblies are used in the two relatively movable discs.

It will be seen from the foregoing description that the concentricities of the solenoid structure and armature, and the rotary actuator assembly are completely separated, the armature is not connected to the rotating disc and floats freely. A small gap is left between the armature end and the rotating disc. Eccentricities of the armature movement are not transmitted to the rotary actuator assembly and cannot cause ball jamming. In this respect it should also be pointed out that the balls are 100% controlled laterally by the slot edges 62, and may therefore be said to be self-caged. The balls are always between the four edges of the slots and there can be no out-of-line relative radial motion whatever during operation of the device. The rotatable member is held in absolute relationship at all times with respect to the stationary member within the accuracy of the slot-edge conformations. As the rotational path of the rotatable member is exactly the same at every cycle, the power take-off match can be made with absolute accuracy without the necessity of allowing for variable lateral sloppiness or cock of the rotary member and attached shaft.

It is to be noted that thrust is taken over four edges of the slots and over two circular paths on the ball. The forces on each edge and ball contact path are therefore only one-half those where there is only one ball contact path and two race surface paths. This greatly reduces wear on both ball and edge and contributes to long trouble-free life.

It is also important to note that the magnetic circuit for the solenoid winding 25 involves only the casing 10, the partition 20 and the armature 30. These parts may be made, without hardness compromise, of the best magnetic material suitable for the purpose. Because they do not enter into the magnetic circuit, the relatively rotating discs 41 and 42, on the other hand, may be made of material hardened after machining even to the extent of nitriding, if desired. However tests of discs using ordinary hardened tool steel show that after a million cycles under load no appreciable wear of either slot edges or ball takes place, even under dusty conditions.

Armature 30, being free, does not rotate with rotating disc 41. During rapid operation, armature 30 drifts in one direction or the other with a slow rotary movement, even though rotary disc 41 reciprocates circularly and rapidly back and forth. There appears to be little if any friction loss between the rotary disc and the adjacent end of the armature and the overall efficiency is high.

Inasmuch as the ball and slot actuator assembly B is independently constructed, it can readily be operated by other pulses than those produced by a solenoid armature, as shown in Figures 11 and 12.

Turning to Figure 11 first, the discs 41 and 42 are mounted in a casing 70 supporting a hydraulic or pneumatic cylinder 71, the piston 72 of which carried a rod 73 bearing on rotatable disc 41. When the piston is moved toward disc 41, disc 41 will rotate. In this case the return spring can be a spiral flat ribbon spring 74 recessed in disc 42.

In Figure 12 the axial movement is provided by a rotatable cam 80 journalled in a frame 81 to which is secured the actuator assembly B. Axial movement of disc 41 by cam 80 will cause rotation of disc 41.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

I claim:

1. Means for converting a linear motion to a combined linear and circular motion comprising a pair of members having parallel adjacently spaced surfaces, one of said members being rotatably mounted with respect to the other, a plurality of pairs of opposed arcuate shaped slots in said surfaces of said members, said slots being substantially identical in shape and size and being defined by arcuate, longitudinally divergent slot edges in the planes of said parallel surfaces, each of said slot pairs having a ball positioned therein and in engagement with said edges thereof, said ball having a diameter greater than the greatest width of said slots and greater than the distance between said surfaces whereby said balls bear on at least two opposite edges of said arcuate slots, said slots being formed to clear said balls between said edges thereof, the arcuity and position of said slot edges being such that a motion of said rotatable member toward and away from said other member, will move said rotatable member both linearly and rotationally.

2. Means for converting a linear motion to a combined linear and circular motion comprising a pair of members having substantially flat parallel adjacently spaced surfaces, one of said members being rotatably mounted with respect to the other, a plurality of pairs of opposed arcuate slots in said members, said slots being substantially identical in shape and size and being defined by arcuate, longitudinally divergent slot edges in the planes of said parallel surfaces, each of said slot pairs having a ball positioned therein and in engagement with said edges thereof, said ball having a width greater than the greatest diameter of said slots and greater than the distance between said surfaces whereby said balls bear on at least two opposite edges of said arcuate slots, said slots being formed to clear said balls between said edges thereof, the curvature and position of said slot edges being such that a motion of said rotatable member toward and away from said other member, will move said rotatable member both linearly and rotationally.

3. A rotary actuator comprising a pair of relatively rotatable and axially movable members having opposed, adjacent, flat and parallel surfaces, a plurality of pairs of slots sunk in said surfaces of said members, with one slot of each such pair in each member, each slot having arcuate diverging longitudinal edges extending from a small end of the slot to a large end thereof, the slots in each pair being opposed with the small ends oppositely adjacent in one relative rotational position of said members and with the large ends of said slots being oppositely adjacent in another relative rotational position of said members, and a ball between each pair of slots, said ball entering said slots and rolling solely on the edges thereof from one of said rotational positions to the other of said rotational positions as said members are relatively rotated thereby, said members moving axially during said relative rotation due to varying ball penetration into said slots, and means for applying one of said relative motions to said members to cause the other of said relative motions.

4. Apparatus in accordance with claim 3 wherein one of said members is stationary and means are provided to move the other member axially to create a combined axial and rotary movement of said axially moved member.

5. Apparatus in accordance with claim 3 wherein means are provided to move said members toward and away from each other to cause said rotary movement.

6. Means for translating a linear motion into a combined linear and rotary motion comprising a pair of spaced adjacent members having opposed surfaces, one of said members being mounted to rotate with respect to the other, a plurality of pairs of arcuate slots of substantially equal size and shape in said surfaces of said member each of said slots having a pair of divergent longitudinal edges in a plane at right angles to the axis of said rotary motion, the slots in each pair being opposed and spaced a predetermined distance apart and being longitudinally divergent in opposite directions, a ball positioned between each pair of slots, said ball being of greater diameter than a maximum width of said slots and of larger diameter than the distance between said surfaces so that each of said balls is confined within the edges of a pair of opposed slots, the curvature of said slots being such that movement of said rotatable member toward and away from said other member will rotate said rotatable member, a solenoid, a solenoid armature, and means for coupling said solenoid armature to said rotatable member in a direction causing said movement when said solenoid is energized.

7. Apparatus in accordance with claim 6 wherein said armature is separate from said rotatable member and frictionally bears on said rotatable member.

8. Means for translating a linear motion into a combined linear and rotary motion, comprising: a pair of relatively rotatable members spaced apart and relatively movable along their axis of rotation, a pair of generally arcuate ball slots, of substantially equal size and shape, formed opposite one another in adjacent sides of said members along arcs of substantially equal radii centering in the region of said axis of rotation, said slots each having a small end and a large end, and diverging longitudinal arcuate edges interconnecting said small and large ends, the longitudinal edges of the two slots diverging in opposite directions about said axis of rotation and being in a plane at right angles to said axis of rotation, means limiting the separation of the slotted sides of the members to a predetermined maximum distance, a ball of greater diameter than said distance and of greater diameter than the maximum width of said slots engageable with and rollable along the two longitudinal edges of both of said slots, said slots being formed to receive and clear said ball between said longitudinal edges thereof, and means for relatively moving said members axially toward one another.

9. The subject matter of claim 8, wherein said slots have longitudinal axes formed on arcs struck on equal radii centered on said axis of rotation, and the two longitudinal edges of each slot are struck on radii centered near but on opposite sides of said axis of rotation.

10. The subject matter of claim 8, wherein said relatively rotatable members are substantially in the form of opposed disks, and including means stationarily mounting one of said disks, and wherein said means for moving said members axially toward one another is coupled to the other of said disks.

11. Means for translating a linear motion into a combined linear and rotary motion comprising a pair of spaced adjacent members having opposed surfaces, one of said members being mounted to rotate with respect to the other, a plurality of pairs of arcuate slots of substantially equal size and shape in said surfaces, each of said slots having a pair of divergent longitudinal edges in a plane at right angles to the axis of said rotary motion, the slots in each pair being opposed and spaced a predetermined distance apart and being longitudinally divergent in opposite directions, a ball between each pair of slots, said ball being of greater diameter than the maximum distance between the edges of said slots and of greater diameter than the space between said members so that each of said balls is confined within the edges of a pair of opposed slots, the curvature of said slots being such that movement of said rotatable member toward and away from said other member will rotate said rotatable member, and means for applying a linear force to one of said members to cause said movement.

References Cited in the file of this patent

UNITED STATES PATENTS

| | | |
|---|---|---|
| 2,328,501 | Schanzer | Aug. 31, 1943 |
| 2,430,940 | Leland | Nov. 18, 1947 |
| 2,449,179 | Sansbury | Sept. 14, 1948 |
| 2,473,597 | Leland | June 21, 1949 |
| 2,539,090 | Leland | Jan. 23, 1951 |
| 2,566,571 | Leland | Jan. 23, 1951 |
| 2,617,949 | Leland | Nov. 11, 1952 |

FOREIGN PATENTS

| | | |
|---|---|---|
| 602,812 | Great Britain | June 3, 1948 |